United States Patent
Dharmastala (10) Patent No.: US 8,650,200 B2
(45) Date of Patent: Feb. 11, 2014

(54) SYSTEM, METHOD, AND COMPUTER PROGRAM PRODUCT FOR IDENTIFYING OBJECTS AS AT LEAST POTENTIALLY UNWANTED BASED ON STRINGS OF SYMBOLS

(75) Inventor: Aravind Dharmastala, Chennai (IN)

(73) Assignee: McAfee, Inc., Santa Clara, CA (US)

( * ) Notice: Subject to any disclaimer, the term of this patent is extended or adjusted under 35 U.S.C. 154(b) by 7 days.

(21) Appl. No.: 13/165,242

(22) Filed: Jun. 21, 2011

(65) Prior Publication Data

US 2011/0252024 A1 Oct. 13, 2011

Related U.S. Application Data (63) Continuation of application No. 11/688,186, filed on Mar. 19, 2007, now Pat. No. 8,001,194.

(51) Int. Cl.
*G06F 17/30* (2006.01)

(52) U.S. Cl.
USPC .......................................................... 707/754

(58) Field of Classification Search
USPC .......................................................... 707/754
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,016,939 B1 * | 3/2006 | Rothwell et al. | 709/206 |
| 7,506,155 B1 | 3/2009 | Stewart et al. | |
| 2004/0221062 A1 * | 11/2004 | Starbuck et al. | 709/246 |
| 2005/0262210 A1 * | 11/2005 | Yu | 709/206 |
| 2007/0038705 A1 * | 2/2007 | Chickering et al. | 709/206 |
| 2008/0104062 A1 | 5/2008 | Oliver et al. | |

OTHER PUBLICATIONS

Gajewski, Wojciech. "Adaptive Naïve Bayesian Anti-Spam Engine" World Academy of Science, Engineering and Technology 7, 2005. pp. 45-50 (6 pages).

Kaufman, Evan "Cut & Paste ASCII Text Generator." *Java Script Kit*. 1997-2007 Mar. 19, 2007, http://wsabstract.com/script/script2/asciitext.shtml.

* cited by examiner

*Primary Examiner* — Joshua Bullock
(74) *Attorney, Agent, or Firm* — Patent Capital Group (57) ABSTRACT

A system, method, and computer program product are provided for identifying objects as being at least potentially unwanted based on strings of symbols identified therein. In use, strings of symbols are identified in a plurality of sequential lines of an object. Further, the object is conditionally identified as being at least potentially unwanted, based on the strings of symbols.

20 Claims, 6 Drawing Sheets

SYSTEM, METHOD, AND COMPUTER PROGRAM PRODUCT FOR IDENTIFYING OBJECTS AS AT LEAST POTENTIALLY UNWANTED BASED ON STRINGS OF SYMBOLS

RELATED APPLICATION

This application is a continuation (and claims the benefit of priority under 35 U.S.C. §120) of U.S. application Ser. No. 11/688,186, filed Mar. 19, 2007 now U.S. Pat. No. 8,001,194, entitled "SYSTEM, METHOD, AND COMPUTER PROGRAM PRODUCT FOR IDENTIFYING OBJECTS AS AT LEAST POTENTIALLY UNWANTED BASED ON STRINGS OF SYMBOLS," Inventor Aravind Dharmastala. The disclosure of the prior application is considered part of (and is incorporated by reference in) the disclosure of this application.

FIELD OF THE INVENTION

The present invention relates to scanning techniques, and more particularly to identifying unwanted objects.

BACKGROUND

Increasingly, computer systems have needed to protect themselves against unwanted objects. Such unwanted objects have taken on a variety of forms including, but not limited to spam within files, electronic messages (e-mails), etc. Traditionally, unwanted objects have been identified utilizing pattern matching techniques. For example, known unwanted words, phrases, and other content have been compared with objects to determine whether such objects are unwanted.

However, identifying unwanted objects in this manner has required that every potentially unwanted object (or component thereof) be predefined for utilization in the pattern matching. Furthermore, the predefined known unwanted objects have conventionally been limited to including only alphabetical characters, etc., thus preventing identification of unwanted objects that include types of characters other than alphabetical characters (e.g. symbols, etc.).

There is thus a need for addressing these and/or other issues associated with the prior art.

SUMMARY

A system, method, and computer program product are provided for identifying objects as being at least potentially unwanted based on strings of symbols identified therein. In use, strings of symbols are identified in a plurality of sequential lines of an object. Further, the object is conditionally identified as being at least potentially unwanted, based on the strings of symbols.

DETAILED DESCRIPTION

Figure 1:
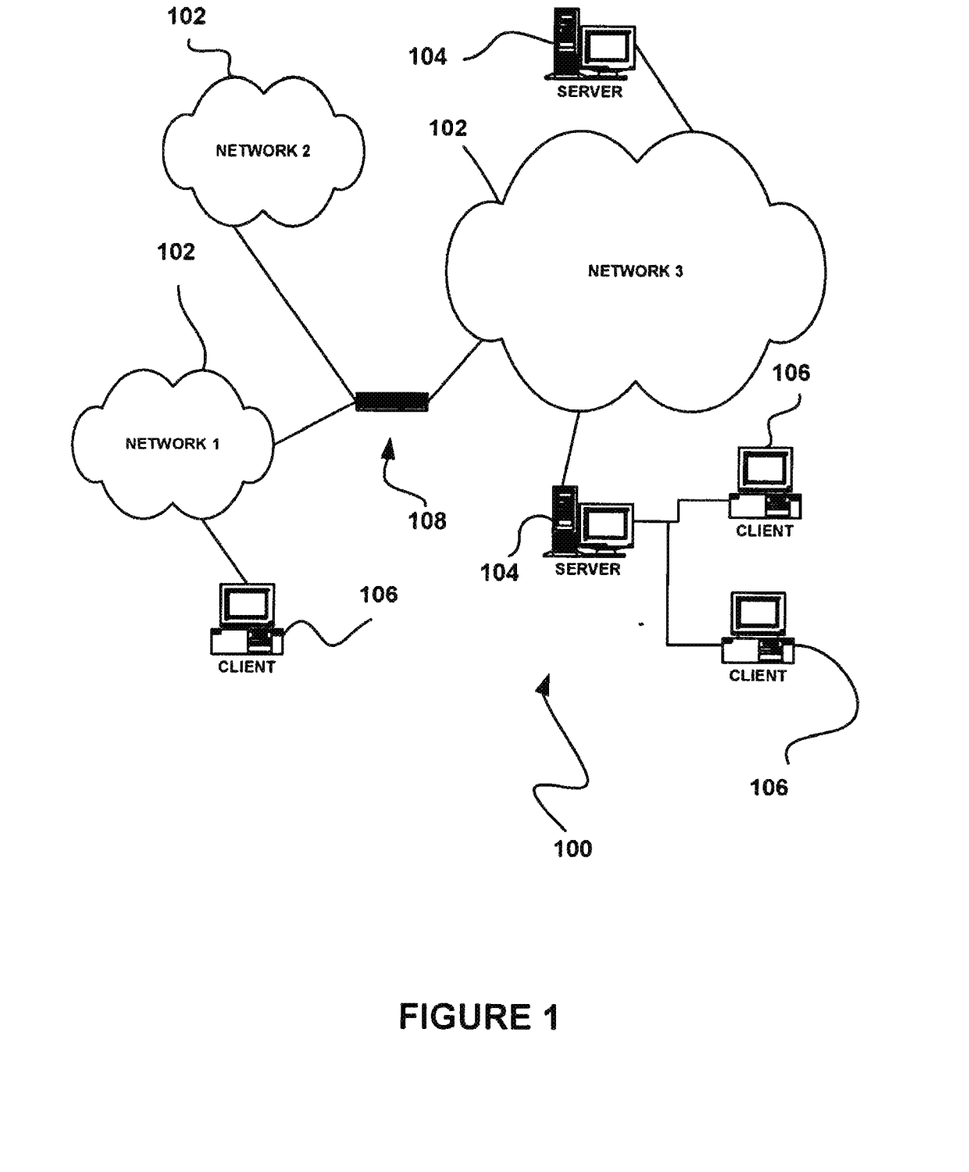
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc), any component of a computer, and/or any other type of logic. In order to facilitate communication among the networks 102, at least one gateway 108 is optionally coupled therebetween.

Figure 2:
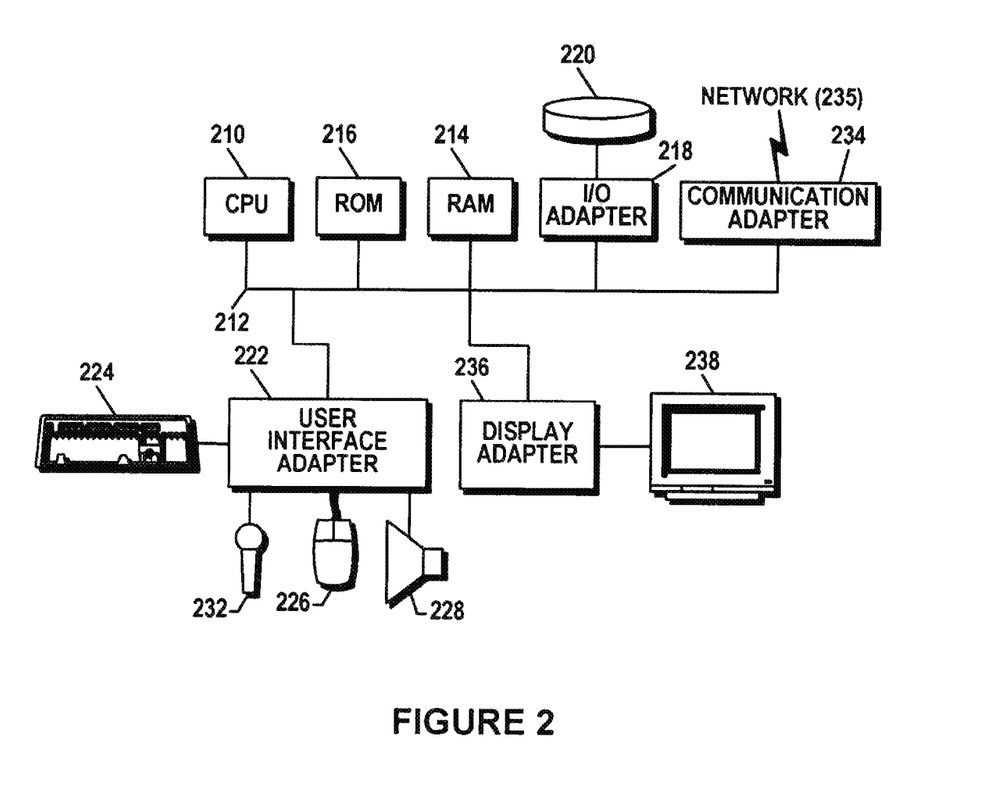
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
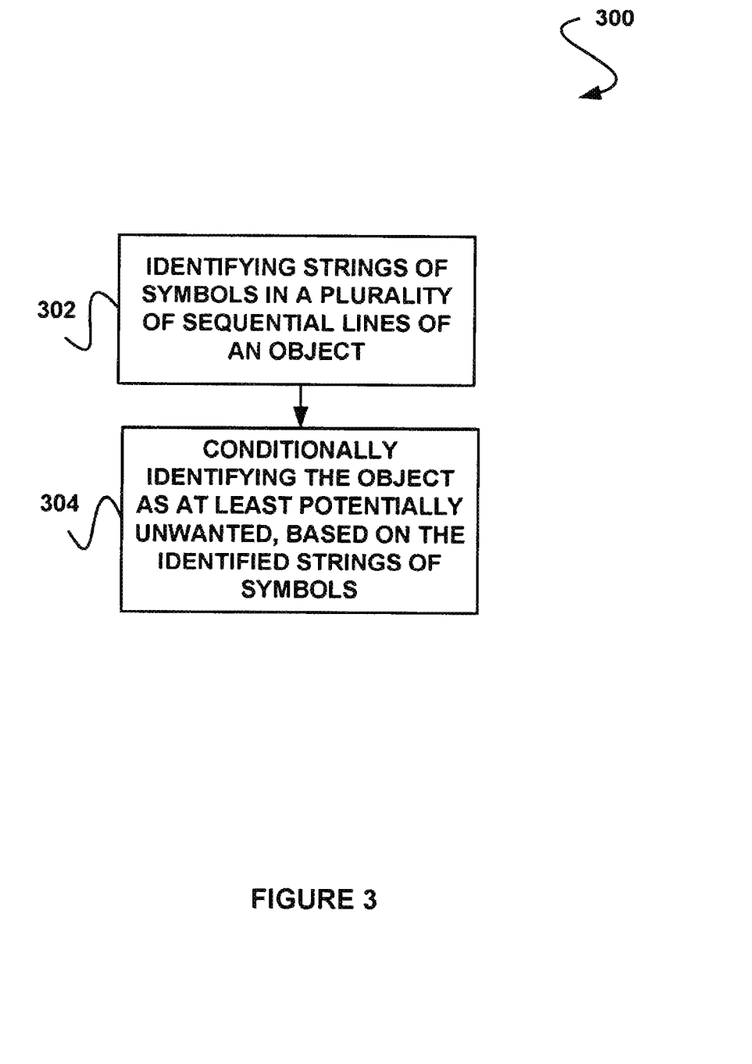
FIG. 3 shows a method for identifying objects as at least potentially unwanted based on strings of symbols identified therein, in accordance with another embodiment.

FIG. 3 shows a method for identifying objects as at least potentially unwanted based on strings of symbols identified therein, in accordance with another embodiment. As an option, the method 300 may be implemented in the context of the architecture and environment of FIGS. 1 and/or 2. Of course, however, the method 300 may be carried out in any desired environment.

As shown in operation 302, strings of symbols are identified in a plurality of sequential lines (e.g. words in lines, etc.) of an object. In the context of the present description, the object may include any entity capable of containing strings of symbols in a plurality of sequential lines thereof. For example, the object may include a file, an electronic mail (e-mail) message, a short message service (SMS) message, etc.

In the present description, the symbols may each include any visual entity. For example, in one embodiment, the symbols may include alphanumeric characters. In other embodiments, the symbols may include other characters such as ".", "-", "_", "*", "@", "'", "|", etc. Also in the present description, it should be noted that the string of symbols may include any set, sequence, series, group, etc. of multiple symbols. Optionally, the strings of symbols may include any desired number of symbols (e.g. 5, 10, 15, etc. symbols).

Further, the strings of symbols may be located in the plurality of sequential lines of the object in any desired manner. In one embodiment, the strings of symbols may be located immediately adjacent to one another across the sequential lines of the object. For example, a first string of two symbols may be located on a first line of the object, whereas a second string of three symbols may be located immediately below the first string on a second line of the object, etc. In another embodiment, the aforementioned second string of three symbols may be located below the first string on a third, fourth, etc. line of the object with any number of other lines therebetween (and still be considered within sequential lines of the object). It should be noted that any number of sequential lines of the object may be populated with the strings of symbols.

To this end, in one embodiment, the strings of symbols may represent a plurality of letters. For example, the strings of symbols in the plurality of sequential lines may represent multiple letters, where each letter is formed across the plurality of sequential lines. In this way, a letter may be represented across two lines, three lines, etc of the object.

In another embodiment, the letters may represent a word. For example, the strings of symbols in the plurality of sequential lines of the object may represent a plurality of letters in a sequence which is further representative of a word. In yet a further embodiment, a sequence of words may further represent a phrase, sentence, etc.

Optionally, the word, phrase, etc. may be associated with unwanted content. In other words, the plurality of letters represented by the strings of symbols in the sequential lines of the object may represent unwanted content. In one embodiment, the unwanted content may be predefined. For example, a plurality of words, phrases, etc. may be predefined as unwanted. In various embodiments, the unwanted content may include spam, offensive (e.g. pornographic, etc.) language, and/or any other content capable of being unwanted. In another embodiment, the mere existence of such plurality of letters represented by the strings of symbols in the sequential lines of the object may be indicative of unwanted content.

Moreover, as shown in operation 304, the object is conditionally identified as at least potentially unwanted, based on the strings of symbols. In one embodiment, the object may be identified as at least potentially unwanted if a word, phrase, etc. represented by the strings of symbols includes, or is likely to include, unwanted content. For example, the word, phrase, etc. represented by the strings of symbols may be compared to predefined (e.g. known, etc.) unwanted content. As mentioned earlier, the mere existence of such letters represented by the strings of symbols may itself be indicative of unwanted content, in other embodiments.

In another embodiment, the object may be identified as at least potentially unwanted if the strings of symbols exceed a particular threshold weight. For example, a plurality of predefined words may be associated with particular weights. In one embodiment, a low weight (e.g. 0, etc.) may indicate that a word is not necessarily associated with unwanted content. In another embodiment, a high weight (e.g. 1, etc.) may indicate that a word is likely to be associated with unwanted content.

To this end, words represented by the strings of symbols may be compared to the predefined words. Furthermore, words represented by the strings of symbols may be assigned a weight based on the weight of any matching predefined words, as determined by the comparison. Still yet, a total weight for the object may be calculated based on the weights of the words represented by the strings of symbols in the object. If the total weight exceeds a predefined threshold, the object may optionally be identified as at least potentially unwanted.

Of course, it should be noted that, while predefined words are described above as being associated with weights, weights may similarly be assigned to predefined sequences of letters, etc. Thus, such predefined sequences of letters may or may not be representative of words. To this end, the object may be conditionally identified as being at least potentially unwanted in any desired manner that is based on the identified strings of symbols.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
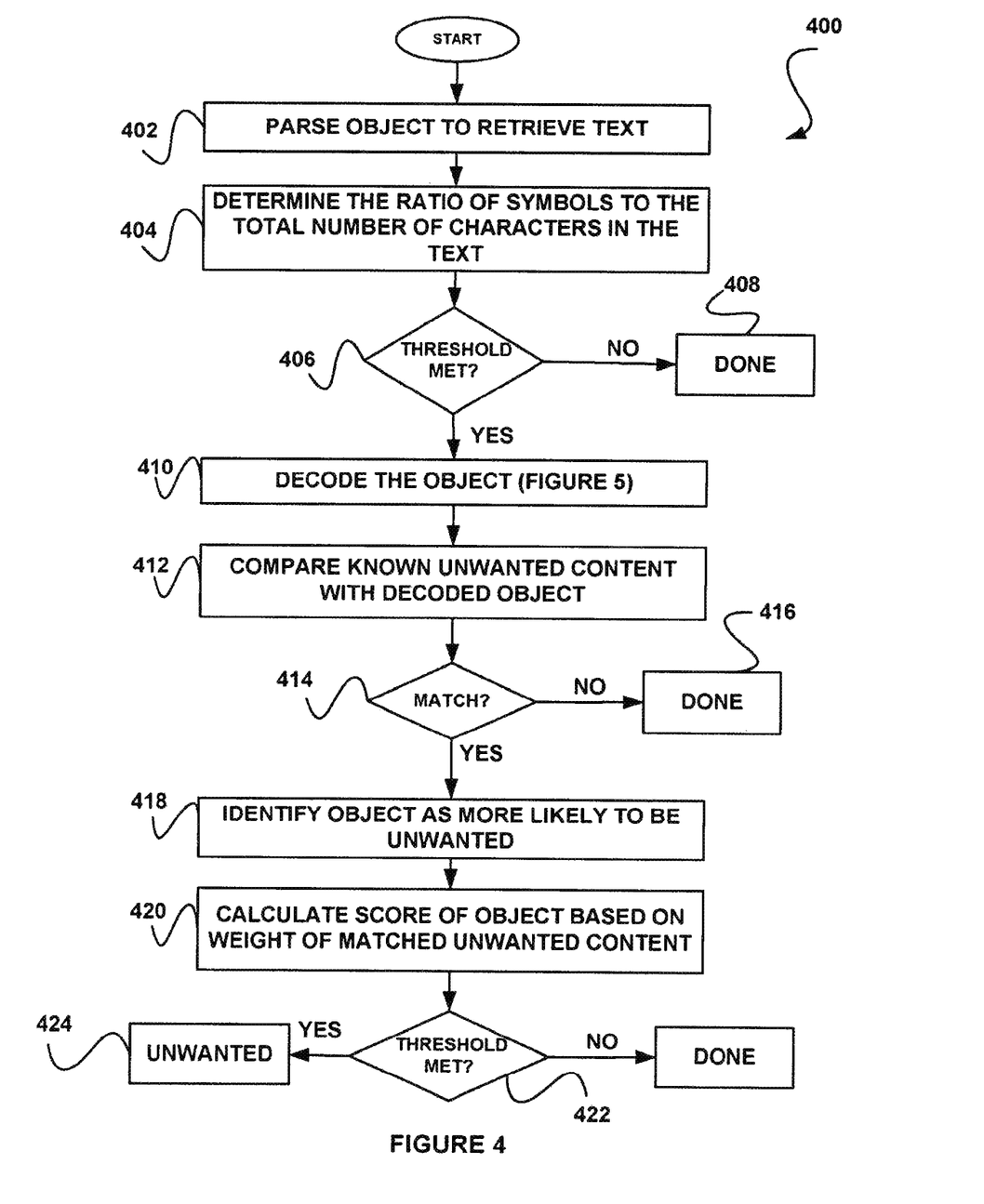
FIG. 4 shows a method for identifying an object as unwanted, in accordance with yet another embodiment.

FIG. 4 shows a method 400 for identifying an object as unwanted, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, an object is parsed to retrieve text associated therewith. The object may be parsed in any desired manner. In one embodiment, the object may be parsed by optionally removing non-text data associated with the object. In various examples, the removed data may include headers, footers, attachments, subject lines, images, etc. To this end, text associated with the object may be retrieved by removing non-text data.

In another embodiment, the object may be parsed by identifying text in a body of the object. Just by way of example, if the object includes an e-mail message, the e-mail message may be parsed so that text in a body thereof may be retrieved. Further, the text may include symbols. In one embodiment, the text may include strings of symbols in a plurality of sequential lines of the object. Thus, the object may be parsed for identifying the strings of symbols.

Additionally, a ratio of a number of the symbols to a total number of characters in the text is determined, as shown in operation 404. In one embodiment, a count of the total number of alphanumeric characters in the text may be identified. Further, a count of the number of symbols in the text may also be identified. Thus, the number of symbols may be divided by the total number of alphanumeric characters, such that the present ratio may be determined.

Furthermore, it is determined whether the ratio exceeds a threshold, as shown in decision 406. In one embodiment, the threshold may be predefined. In another example, the threshold may include a particular value which indicates that the object is likely to include content represented by symbols. Just by way of example, the threshold may include 75%, but of course may also include any desired amount. Optionally, the threshold may be user-defined.

If the ratio does not meet the threshold, processing of the object for unwanted content represented by symbols is terminated, as shown in operation 408. If, however, the ratio does meet the threshold, the object is decoded, as shown in operation 410.

In one embodiment, decoding the object may involve decoding symbols in the object. Optionally, such decoding may include identifying letters, words, phrases, etc. represented by the symbols in the text of the object. One example of decoding the object will be described in more detail hereinafter with respect to FIG. 5. Of course, it should be noted, however, that the object may be decoded in any desired manner.

Still yet, known unwanted content is compared with the decoded object, as shown in operation 412. The known unwanted content may include any content that is predetermined (e.g. user-defined, etc) to be unwanted. Additionally, the known unwanted content may optionally be stored in a database of known unwanted content.

In one embodiment, the known unwanted content may include alphabetical words, phrases, etc., and/or portions thereof, that are capable of being represented by symbols in text. Just by way of example, the known unwanted content may include the words "SUCKS" and/or "5UCK5", which may be represented utilizing any combination of the symbols "-", "_", "|", "/", etc. across sequential lines of the object. In this way, known unwanted content may be compared to the decoded object in order to identify symbols included therein that may potentially represent such known unwanted content.

As shown in decision 414, it is determined whether the decoded object matches the unwanted content. For example, it may be determined whether any letters, words, phrases, etc represented by symbols in the text of the object match the unwanted content. In some embodiments, only a portion of the decoded object need match the unwanted content while, in other embodiments, the entire decoded object may need to match unwanted content.

If it is determined that the decoded object does not match the unwanted content, processing of the decoded object for unwanted content represented by symbols located therein is terminated, as shown in operation 416. If, however, it is determined that the decoded object does match the unwanted content, the object is identified as more likely to be unwanted. Note operation 418. Just by way of example, the object may be identified as potentially including spammy content, phishing content and/or any other content that may be unwanted.

Moreover, a score associated with the object is calculated based on a weight of the matched unwanted content (represented by the strings of symbols in the text), as shown in operation 420. In one embodiment, each word, phrase, etc. (and/or portions thereof) of unwanted content may be associated with a weight. In another embodiment, the weight may indicate a degree to which the matched unwanted content is unwanted.

For example, a low weight (e.g. 0, etc.) may indicate that the matched unwanted content is not necessarily unwanted, whereas a high weight (e.g. 1, etc.) may indicate a greater likelihood that the matched unwanted content is actually unwanted. Optionally, the weights may be user-defined (e.g. utilizing rules, etc.). In this way, a user may customize the type of words, phrases, etc which are identified as unwanted. Further, the score may be based on the weights. For example, the score may be a function of the weights (e.g. a sum of the weights, etc.).

Further, the score may be utilized to determine whether the object is in fact unwanted. As shown, the score may be compared with a threshold (operation 422), such that a score exceeding the threshold may be identified as unwanted (operation 424). Additionally, as an option, if the object is identified as unwanted based on the score, action may be taken. For example, such action may include deleting the object, transferring the object to a predefined location, issuing an alert, etc.

Figure 5:
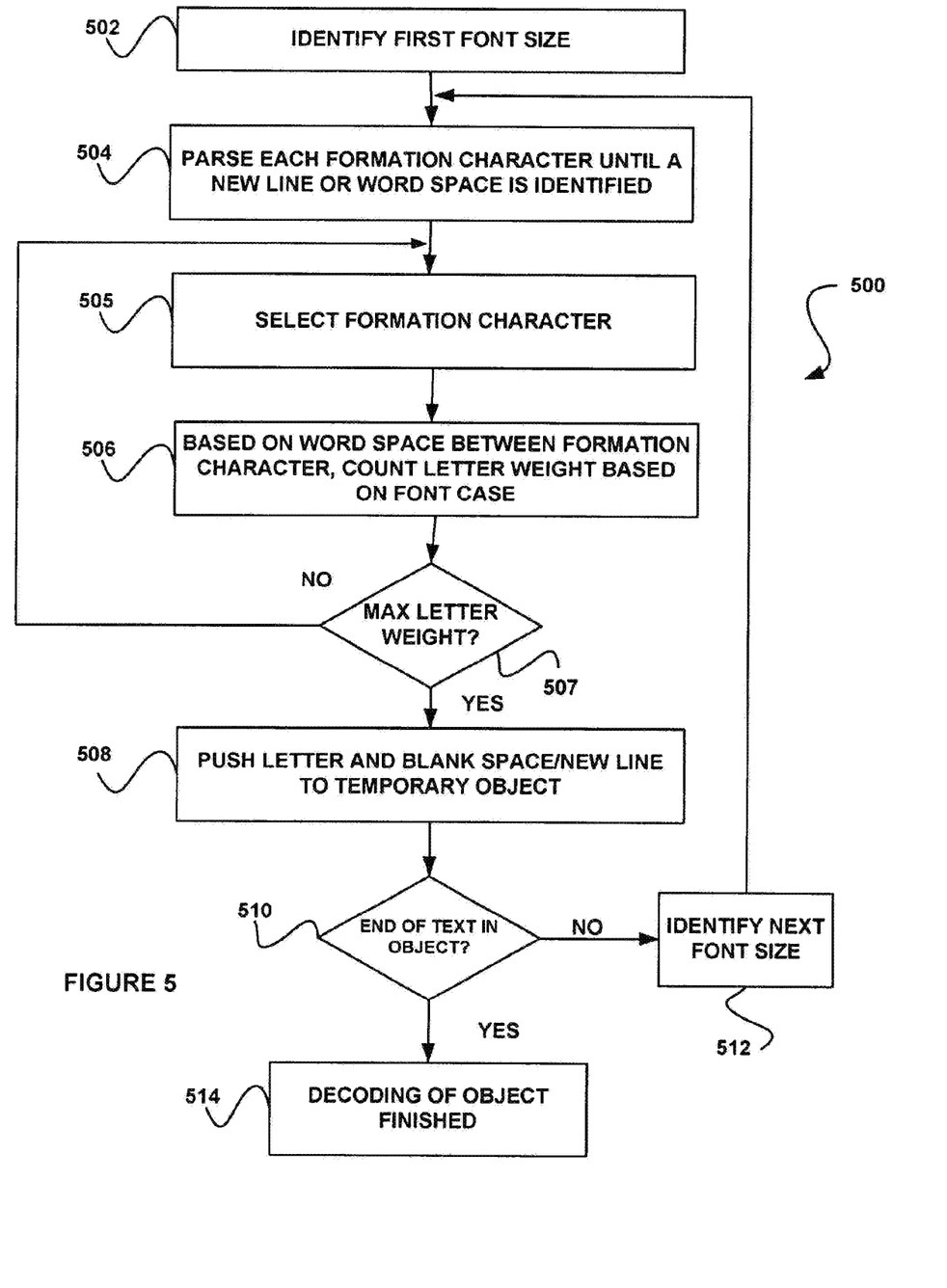
FIG. 5 shows a method for decoding an object, in accordance with still yet another embodiment.

FIG. 5 shows a method 500 for decoding an object, in accordance with still yet another embodiment. As an option, the method 500 may be carried out in the context of the architecture and environment of FIGS. 1-4. For example, the method 500 may be carried out in the context of operation 410 of FIG. 4. Of course, however, the method 500 may be carried out in any desired environment. It should also be noted that the aforementioned definitions may apply during the present description.

As shown in operation 502, a first font size is identified. In one embodiment, the font size may represent a size of a letter capable of being represented by strings of symbols in a plurality of sequential lines of the object. In another embodiment, the font size may be based on a particular formation character and font, case.

Such formation character may include any symbol(s) capable of being utilized to represent a letter, for example. In addition, the font case may include upper case, lower case, proper case, etc. Just by way of example, the font size may include any value from 8 to 50 (by way of example).

Further, each formation character is parsed, based on the font size, until a new line or a word space is identified, as shown in operation 504. In one embodiment, the word space may include a blank space between letters represented by strings of symbols. Optionally, the word space may be based on the font size, the formation character and/or the font case.

Still yet, each formation character may be parsed in any desired manner. For example, a database of fonts (e.g. capital letters A-Z and lowercase letters a-z) and available font sizes for such fonts may be utilized.

Table 1 illustrates one example of a database of fonts and available font sizes associated therewith. It should be noted that Table 1 is set forth illustrative purposes only, and thus should not be construed as limiting in any manner.

TABLE 1

| FONT | FONT SIZE | WIDTH | LINES |
|------|-----------|-------|-------|
| S    | 8         | 2     | 3     |
|      | 9         | 3     | 3     |
| U    | 8         | 3     | 2     |
|      | 9         | 4     | 2     |
| C    | 9         | 3     | 3     |
|      | 10        | 3     | 4     |
| K    | 8         | 2     | 2     |
|      | 9         | 3     | 2     |
| S    | 8         | 2     | 3     |
|      | 9         | 3     | 3     |

Thus, for a particular font and font size, strings of symbols may be identified based on the associated width and line values. For example, for font "S" and font size 9, symbols in 3 consecutive spaces may be identified in each of 3 sequential lines. Thus, such parsing may allow strings of symbols across sequential lines of the object to be identified.

Still yet, a letter weight is counted based on a font case and the word space between each formation character. This is an iterative process that begins with the selection of a formation character in operation 505 and proceeds with operation 506.

The letter weight may include a value indicating a probability that a formation character of the object, at least in part, represents a particular letter.

To accomplish this, various symbols and associated information may be included in a database. Table 2 illustrates one example of such a database. Again, it should be noted that Table 2 is set forth for illustrative purposes only, and thus should not be construed as limiting in any manner.

TABLE 2

| FONT | FONT SIZE | SYMBOLS | | | | | | SEQUENCE NUMBER | | | | | | |
|---|---|---|---|---|---|---|---|---|---|---|---|---|---|---|
| | | FC(1) | FC(2) | FC(3) | FC(4) | FC(5) | ... | | | | | | | |
| S | 9 | — | | | — | (NOT AVAILABLE) NA | NA | 1 | 2 | 3 | 3 | 2 | (END OF ARRAY) EOA | EOA |
| K | 9 | | | — | / | \ | NA | 1 | 2 | 3 | 1 | 4 | EOA | EOA |
| k | 9 | | | — | / | \ | NA | 1 | 2 | 1 | 2 | 3 | 1 | 4 |
| U | 9 | | | — | NA | NA | NA | 1 | 1 | 1 | 1 | 2 | 1 | EOA |
| C | 9 | — | | | — | NA | NA | 1 | 1 | 2 | 2 | 3 | EOA | EOA |

Just by way of example, it may be determined whether the sequence of symbols associated with a predefined formation character with font size 9 and font "S" matches a sequence of symbols associated with any of the parsed formation characters associated with the object. For example, sequence number 1 for font size 9 and font "S" is associated with formation character subpart 1 (i.e. FC(1)), as indicated in Table 2. Thus, it may be determined whether the symbol indicated in FC(1) matches a first symbol in the sequence of symbols.

If a match is found, the letter-weight may be incremented by 1. If however, a match is not found, the letter-weight may be decreased by 1. In one embodiment, the letter-weight may initially be 0 for each font.

Further, for each subsequent sequence number associated with font size 9 and font "S", it may be determined whether a symbol indicated thereby matches a subsequent symbol associated with a formation character of the object. Accordingly, the letter-weight may be incremented based on a number of matching symbols between a formation character in the object and a predefined formation character. Of course, it should be noted that the letter weight may be calculated in any desired manner.

The operations 505 and 506 are continued until a letter weight is maximized. See decision 507. If such maximization occurs, a letter associated with the formation character in the object is pushed to a temporary object. Note operation 508. For example, if the letter weight is maximized with respect to a particular font (e.g. "S"), a letter indicated by such particular font is pushed to the temporary object. Thus, the letter that is pushed to the temporary object may be based on a maximum letter weight associated with the formation character.

In the present embodiment, the temporary object may include any data structure capable of storing letters associated with formation characters. For example, the temporary object may include a database, a list, a stack, etc. In addition, while the letter is described as being pushed to the temporary object, it should be noted that the letter may be added to the temporary object in any desired manner.

It is further determined whether an end of text in the object has been reached, as shown in decision 510. If it is determined that the end of the text has not been reached, a next font size may be identified, as shown in operation 512. Formation characters in the object for such next font size may then be parsed, as described above with respect to operations 504-508.

In response to a determination that the end of the text in the object has been reached, the decoding of the object is terminated, as shown in operation 514. Thus, a plurality of letters associated with formation characters in the object may be pushed to the temporary object. As an option, a sequence of the formation characters in the object may be utilized for sequentially organizing the letters in the temporary object.

Figure 6:
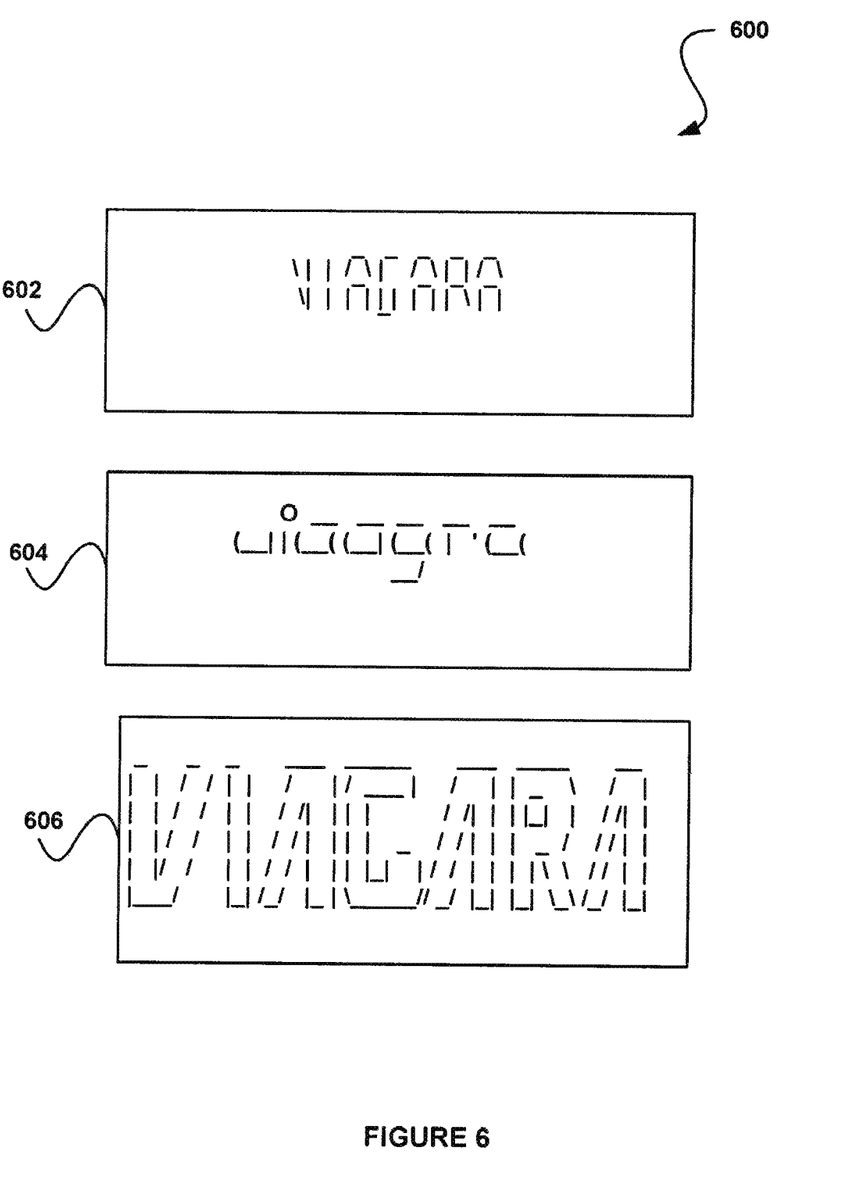
FIG. 6 shows unwanted content represented by strings of symbols in a plurality of sequential lines of an object, in accordance with another embodiment.

FIG. 6 shows unwanted content represented by strings of symbols in a plurality of sequential lines of an object, in accordance with another embodiment. As an option, the unwanted content may include the unwanted content described above with respect to FIGS. 1-5. It should also be noted that the aforementioned definitions may apply during the present description.

As shown in a first object 602, the word "VIAGRA" may be represented utilizing a plurality of letters. Further, each letter may be represented utilizing strings of symbols in a plurality of sequential lines of the object 602. As shown, the letter "A" may be represented by a particular font with a font size of 8, which includes a width of 3 characters for each of 2 consecutive lines.

As shown in a second object 604 and a third object 606, the word "VIAGRA" may also be represented utilizing a plurality of letters, where each letter may be represented utilizing strings of symbols in a plurality of sequential lines. As shown in the first object 604, second object 604 and third object 606, the various letters may be represented utilizing different strings of symbols. In addition, such strings of symbols may be located in a plurality of sequential lines.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving an electronic mail message at a client computing device that includes a processor and a memory;
    parsing an object included in the electronic mail message to allow strings of symbols across lines of the object to be identified;
    determining a ratio of symbols in a portion of the object to a total number of characters in the portion of the object;
    comparing the ratio to a predetermined threshold to determine whether the object should be decoded;
    decoding characters of the object based on a font size and associations of formation characters to determine decoded characters that extend across sequential lines of the object, wherein for a particular font and the font size, the strings of symbols are identified as formation characters based on corresponding width and line values associated with consecutive spaces in sequential lines;

comparing the decoded characters to known unwanted content; and calculating a score associated with the object based on a predefined weight for decoded characters that match the known unwanted content.

2. The method of claim 1, wherein the decoded characters represent letters.

3. The method of claim 2, wherein the letters represent a word.

4. The method of claim 2, wherein the letters represent unwanted content.

5. The method of claim 1, wherein the decoded characters include alphanumeric characters.

6. The method of claim 1, wherein the object is a file.

7. The method of claim 1, wherein the font size is based on a font case of the decoded characters being represented by the strings of symbols.

8. The method of claim 1, wherein the decoded characters are associated with the strings of symbols and are stored in a temporary object.

9. Non-transitory media that includes code for execution and when executed by one or more processors is operable to perform operations comprising:

receiving an electronic mail message at a client computing device that includes a processor and a memory;

parsing an object included in the electronic mail message to allow strings of symbols across lines of the object to be identified;

determining a ratio of symbols in a portion of the object to a total number of characters in the portion of the object;

comparing the ratio to a predetermined threshold to determine whether the object should be decoded;

decoding characters of the object based on a font size and associations of formation characters to determine decoded characters that extend across sequential lines of the object, wherein for a particular font and the font size, the strings of symbols are identified as formation characters based on corresponding width and line values associated with consecutive spaces in sequential lines;

comparing the decoded characters to known unwanted content; and calculating a score associated with the object based on a predefined weight for decoded characters that match the known unwanted content.

10. The media of claim 9, wherein the font size is based on a font case of the decoded characters represented by the strings of symbols.

11. The media of claim 9, wherein the decoded characters represent letters.

12. The media of claim 11, wherein the letters represent a word.

13. The media of claim 11, wherein the letters represent unwanted content.

14. The media of claim 9, wherein the decoded characters include alphanumeric characters.

15. An apparatus, comprising:

one or more processors operable to execute instructions such that the apparatus is configured for:

receiving an electronic mail message;

parsing an object included in the electronic mail message to allow strings of symbols across lines of the object to be identified;

determining a ratio of symbols in a portion of the object to a total number of characters in the portion of the object;

comparing the ratio to a predetermined threshold to determine whether the object should be decoded;

decoding characters of the object based on a font size and associations of formation characters to determine decoded characters that extend across sequential lines of the object, wherein for a particular font and the font size, the strings of symbols are identified as formation characters based on corresponding width and line values associated with consecutive spaces in sequential lines;

comparing the decoded characters to known unwanted content; and calculating a score associated with the object based on a predefined weight for decoded characters that match the known unwanted content.

16. The apparatus of claim 15, wherein the font size is based on a font case of the decoded characters represented by the strings of symbols.

17. The apparatus of claim 15, wherein the decoded characters represent letters.

18. The apparatus of claim 17, wherein the letters represent a word.

19. The apparatus of claim 17, wherein the letters represent unwanted content.

20. The apparatus of claim 15, wherein the decoded characters include alphanumeric characters.

* * * * *